United States Patent
Grundy (10) Patent No.: US 11,551,270 B2
(45) Date of Patent: Jan. 10, 2023

(54) METHODS AND SYSTEMS FOR E-COMMERCE FULFILLMENT

(71) Applicant: ODD BOOKWORM LLC, Fairview, NJ (US)

(72) Inventor: Jiogy Grundy, Fairview, NJ (US)

(73) Assignee: Odd Bookworm LLC, Fairview, NJ (US)

( * ) Notice: Subject to any disclaimer, the term of this patent is extended or adjusted under 35 U.S.C. 154(b) by 709 days.

(21) Appl. No.: 16/210,293

(22) Filed: Dec. 5, 2018

(65) Prior Publication Data

US 2020/0184519 A1 Jun. 11, 2020

(51) Int. Cl.
G06Q 30/02 (2012.01)
G06Q 10/08 (2012.01)
G05B 19/048 (2006.01)
G06Q 30/06 (2012.01)
G05B 19/418 (2006.01)
G06T 7/00 (2017.01)

(52) U.S. Cl.
CPC ....... G06Q 30/0278 (2013.01); G05B 19/048 (2013.01); G05B 19/41815 (2013.01); G06Q 10/087 (2013.01); G06Q 30/0283 (2013.01); G06Q 30/0635 (2013.01); G06T 7/0004 (2013.01)

(58) Field of Classification Search
None
See application file for complete search history.

(56) References Cited

U.S. PATENT DOCUMENTS

| | | | |
|---|---|---|---|
| 8,407,110 B1 * | 3/2013 | Joseph | G06Q 10/087 705/26.81 |
| 8,447,664 B1 * | 5/2013 | Pape | G06Q 10/087 705/28 |
| 8,527,373 B1 | 9/2013 | Ricci et al. | |
| 9,710,797 B2 | 7/2017 | Killoran, Jr. | |
| 2002/0077867 A1 | 6/2002 | Gittins et al. | |
| 2002/0143663 A1 | 10/2002 | Walsh et al. | |
| 2006/0195364 A1 * | 8/2006 | Shroff | G06Q 30/08 705/26.8 |

(Continued)

FOREIGN PATENT DOCUMENTS

WO WO-02073369 A2 * 9/2002 ............. G06Q 10/08

*Primary Examiner* — Jan P Mincarelli
(74) *Attorney, Agent, or Firm* — Kanika Radhakrishnan; Evergreen Valley Law Group (57) ABSTRACT

Methods and systems for e-commerce fulfillment is disclosed. The method includes sending instruction to product feeder to receive a plurality of products. The method includes sending instruction to product feeder to place each product of plurality of products on a conveyor belt after receiving plurality of products. The method includes receiving product barcode information associated with each product of plurality of products from a barcode scanner. The method includes receiving sales data associated with each product based on product barcode information associated with each product. The method includes computing a return on investment (ROI) associated with each product based on a product value of each product obtained from sales data. The method further includes sending an instruction to conveyor belt to channelize product in a first conveyor path of conveyor belt if ROI of a product of plurality of products is more than or equal to a threshold ROI.

20 Claims, 6 Drawing Sheets

(56) References Cited

U.S. PATENT DOCUMENTS

| | | | |
|---|---|---|---|
| 2006/0224355 A1* | 10/2006 | Morrison | G06Q 30/0185 |
| | | | 702/173 |
| 2012/0012649 A1 | 1/2012 | Hsu | |
| 2014/0333761 A1* | 11/2014 | Porter | G07F 7/069 |
| | | | 348/135 |
| 2017/0323250 A1 | 11/2017 | Lindbo et al. | |
| 2018/0047006 A1* | 2/2018 | Johnson | G06Q 20/047 |

* cited by examiner

METHODS AND SYSTEMS FOR E-COMMERCE FULFILLMENT

TECHNICAL FIELD

Embodiments of the disclosure relate generally to e-commerce and, more particularly to, methods and systems for e-commerce fulfillment.

BACKGROUND

The internet continues to attain more and more users each passing year and online retail is growing faster than any other retail sector. The e-commerce boom has certainly changed the way we shop for the better. But, like everything else, the world of online shopping is not all roses for sellers using the e-commerce platforms for selling a variety of products as well as for persons who are involved in handling the inventory of the e-commerce platforms.

Each product, before getting listed in the e-commerce platforms, needs to be checked for condition/quality and the sales data associated with the product needs to be determined. Further, a shipment of the product needs to be prepared with an attached label indicating an address of the destination where it needs to be shipped.

Currently, a user needs to manually inspect the product and to gather the sales data associated with the product. Then, the user can either manually apply a label and prepare shipment or purchase an assembly line equipped with an automatic label applicator and shipment box preparer for preparing the shipment. The manual process of gathering sales data and performing an inspection of the product is tedious and time taking.

In the light of the above discussion, there is a need for a method and a system that can automate the process of product condition identification and sales data collection while also performing packaging of the product.

SUMMARY

Various embodiments of the present disclosure provide methods and systems for e-commerce fulfillment.

In an embodiment, a method is disclosed. The method includes sending an instruction to a product feeder to receive a plurality of products. The method includes sending an instruction to the product feeder to place each product of plurality of products on a conveyor belt after receiving the plurality of products. The method includes receiving a product barcode information associated with each product of the plurality of products from a barcode scanner. The barcode scanner is preconfigured in an automatic mode for continuous scanning of the plurality of products placed on the conveyor belt. The method includes receiving a sales data associated with each product based on the product barcode information associated with each product. The method includes computing a return on investment (ROI) associated with each product based on a product value of each product obtained from the sales data. The method further includes sending an instruction to the conveyor belt to channelize the product in a first conveyor path of the conveyor belt if the ROI of a product of the plurality of products is more than or equal to a threshold ROI. The first conveyor path is for products approved for shipment.

In another embodiment, a server system is disclosed. The server system comprises a memory to store instructions and a processor to execute the stored instructions in the memory and thereby cause the server system to send an instruction to a product feeder to receive a plurality of products. The server system is further caused to send an instruction to the product feeder to place each product of the plurality of products on a conveyor belt after receiving the plurality of products. The server system is further caused to receive a product barcode information associated with each product of the plurality of products from a barcode scanner. The barcode scanner is being preconfigured in an automatic mode for continuous scanning of the plurality of products placed on the conveyor belt. The server system is further caused to receive a sales data associated with each product based on the product barcode information associated with each product. The server system is further caused to compute a return on investment (ROI) associated with each product based on a product value of each product obtained from the sales data. The server system is further caused to send an instruction to the conveyor belt to channelize the product in a first conveyor path of the conveyor belt. The first conveyor path is for products approved for shipment.

In yet another embodiment, a system is disclosed. The system comprises a product feeder, a barcode scanner, a plurality of cameras, a product stacker and a processing module. The product feeder is adapted to place a plurality of products on a conveyer belt. The conveyer belt is configured to carry the plurality of products from one place to another. The barcode scanner is adapted to be placed on the conveyor belt. The barcode scanner is configured to continuously scan barcode provided on each product of the plurality of products to determine product barcode information associated with each product of the plurality of products as they move along the conveyor belt. The plurality of cameras is configured to capture a plurality of pictures of each product of the plurality of products. The processing module provides operating instructions to the product feeder, the conveyer belt, the barcode scanner and the plurality of cameras, and processes information collected by the barcode scanner and the plurality of cameras. The processing module comprises a product identification engine configured to collect sales data associated with each product of the plurality of products based on the product barcode information, to calculate a product value of each product based on the sales data associated with each product and to compute a Return on Investment (ROI) for each product based on the product value of each product. The processing module to further configured to classify the plurality of products into valuable products and non-valuable products by comparing the calculated ROI with a threshold ROI for each product of the plurality of products based on the product value of each product and send an instruction to the conveyor belt to channelize the product to a first conveyor path of the conveyor belt if the ROI of a product of the plurality of products is more than or equal to a threshold ROI. The first conveyor path is for products approved for shipment. The product stacker is configured to receive the plurality of products from the conveyer belt and store the plurality of products in a compartment for labelling.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for e-commerce fulfillment.

A seller who wants to sell products on an online selling platform needs to manually inspect the product and gather the research sales data associated with the product before uploading the products on the online selling platform. Then, the seller has to manually prepare the shipment for the products or he/she has to purchase an assembly line equipped with an automatic label applicator and shipment box preparer for preparing the shipment for the products. However, such a manual process is tedious and time taking. Hence, to resolve this issue, a fully automated system for e-commerce fulfillment is provided.

The system comprises a product feeder that is configured to receive a product from a seller facility/user facility and dispenses the received product on a conveyor belt. The conveyor belt is provided with a barcode scanner which scans the barcode provided on the product to collect the product barcode information of the product. The product barcode information is received by a processing module provided in the system. The processing module may call a sales data API using the product barcode information to collect sales data associated with the product. The sales data API may return the sales data associated with the product to the processing module. A product value is calculated by the processing module based on the received sales data and the product value is further used to calculate an ROI for the product. The calculated ROI is then compared by the processing module with a threshold ROI preset by the seller for the product. If the product is found valuable by the processing module, the product continues along a first conveyor path of the conveyor belt and if not, the product is channelized/diverted to a second conveyor path of the conveyor belt from where the product will be discarded.

In an embodiment, a plurality of cameras is provided on the first conveyor path of the conveyor belt. The plurality of cameras may capture a plurality of pictures of the product from all sides. The plurality of pictures may be used by the processing module to determine the condition of the product. After determining the condition, the product is listed on the online selling platform for selling.

A product stacker is provided on the first conveyor path of the conveyor belt to collect the product from the conveyor belt and to place the product in a compartment for preparing shipment. Once products greater than a predefined limit for a shipment box are collected in the compartment, a shipment label is generated by the processing module. The product stacker places the products in the shipment box, seals the shipment box with a tape and paste the generated shipment label on the shipment box. The shipment box is now ready to be dispatched. In an embodiment, the dispatched shipment may reach a fulfillment center which is responsible for fulfilling e-commerce orders placed through the online selling platform.

It must be noted that the terms 'e-commerce platform' and 'online selling platform' have been used interchangeably throughout the description and these terms refer to the online selling platform where different sellers can sell their products together.

Figure 1:
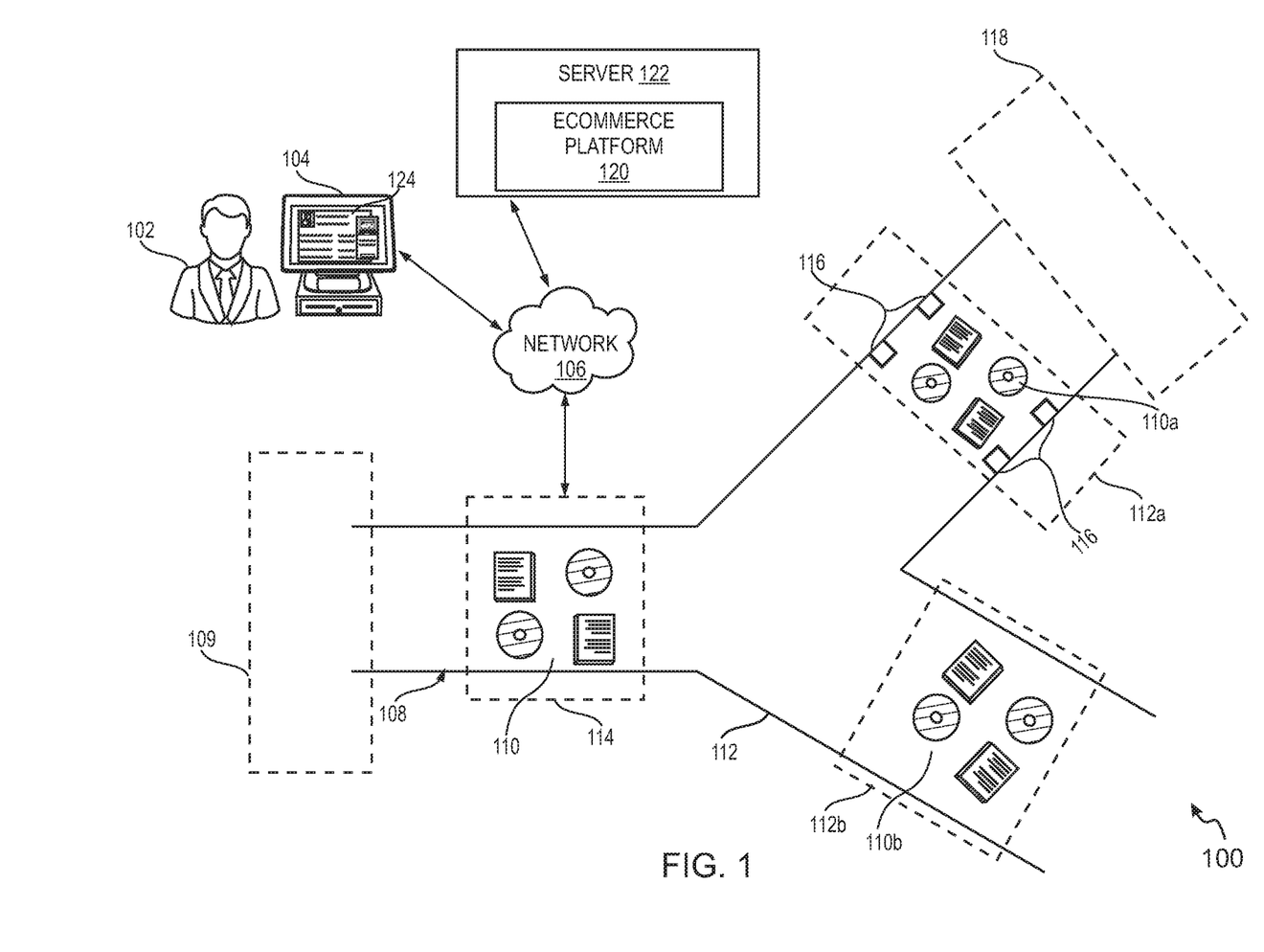
FIG. 1 is an illustration of an environment, where at least some example embodiments can be practiced.

FIG. 1 is an illustration of an environment 100 where at least some example embodiments may be practiced. The environment 100 includes a network 106 (e.g., a wireless communication network, Internet, Wireless Local Area Network (WLAN), Wide Area Network (WAN), etc.) that connects entities such as, a user device 104 of a user 102, an e-commerce platform 120 provided in a server 122 and an e-commerce fulfillment machine 108. The user device 104 may be capable of being connected to a wireless communication network (such as the network 106). Examples of the user device 104 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

In at least one example embodiment, the user device 104 is equipped with an e-commerce fulfillment application 124 that facilitates automatic product sales data collection, product condition identification and label generation. The user device 104 may be any communication device having hardware components for enabling User Interfaces (UIs) of the e-commerce fulfillment application 124 to be presented on the user device 104. In an embodiment, the user 102 may access the e-commerce fulfillment application 124 for setting a threshold return on investment (ROI) for each product of a plurality of products 110 that the user wants to sell on an e-commerce platform 120.

The e-commerce platform 120 may be an application/tool resting at the server 122. In an embodiment, the server 122 is configured to host and manage the e-commerce platform 120 and communicate with device, such as the user device 104, and the e-commerce fulfillment machine 108 using the network 106.

In an embodiment, the server 122, via the server e-commerce platform 120, provides the e-commerce fulfillment application 124, in response to a user request received from the user device 104 via the network 106. In some embodiments, the e-commerce fulfillment application 124 may be factory-installed on the user device 104 and the user 102 may not need to specifically request the e-commerce fulfillment application 124 from the server 122.

In at least one example embodiment, the e-commerce fulfillment machine 108 is configured to automatically process, list, and package a batch of products for ecommerce sale. Examples of the product include but not limited to used books, Compact Disks (CDs), Digital Versatile Disks (DVD) etc. At first, the e-commerce fulfillment machine 108 classifies the plurality of products 110 into valuable products 110a and non-valuable products 110b and then determines the condition of the valuable products 110a. After determining the condition of the valuable products 110a, the e-commerce fulfillment machine 108 prepares a shipment box for the valuable products 110a. The prepared shipment box comprises a shipment label indicating destination location of the shipment.

In an example scenario, a user (e.g., the user 102) who wants to sell a plurality of used products (e.g., the plurality of products 110) on an e-commerce platform may need to perform product condition identification and product sales data collection before uploading the plurality of products on the e-commerce platform. A shipment containing the plurality of products also needs to be prepared for shipping the plurality of products. Instead of manually doing all the tasks, the user can set a threshold ROI for each product of the plurality of products and a maximum weight capacity or a predefined limit for inbound shipments using the e-commerce fulfillment application 124 installed on the user device (e.g., the user device 104). The e-commerce fulfillment machine 108, which is controlled by the e-commerce fulfillment application 124, may start process of classification of the plurality of products after receiving the ROI information for each product from the e-commerce fulfillment application 124.

The e-commerce fulfillment machine 108 includes a product feeder 109 which places the plurality of products on a conveyor belt 112. The conveyor belt 112 includes a product scanner 114 which classifies the plurality of products into valuable products 110a and non-valuable products 110b using the ROI data for each product of the plurality of products.

In an embodiment, the valuable products 110a are diverted to a first conveyor path 112a of the conveyor belt 112 and the non-valuable products 110b are diverted to a second conveyor path 112b of the conveyor belt 112. Further, the condition of the valuable products 110a is determined using a plurality of cameras 116 installed on the first conveyor path 112a of the conveyor belt 112 and the non-valuable products 110b placed on the second conveyor path 112b are discarded by the e-commerce fulfillment machine 108.

In at least one example embodiment, after determining condition of the valuable products 110a, the valuable products 110a are automatically listed on the e-commerce platform 120 based on the predefined limit set by the user for inbound shipments in the e-commerce fulfillment application 124. After listing, the valuable products 110a travel to a stacker 118 by the conveyor belt 112. The stacker 118 prepares a shipment for the valuable products 110a. The prepared shipment is shipped to a fulfillment center. In an embodiment, the fulfillment center is responsible for fulfilling orders placed through the e-commerce platform.

In an embodiment, the server 122 is configured to host and manage the e-commerce fulfillment application 124 within the e-commerce platform 120, and the server 122 communicates with user device, such as the user device 104. In an example, the e-commerce fulfillment application 124 may be accessed through the web via the network 106. In another example, the user device 104 may access an instance of the e-commerce fulfillment application 124 from the server 122 for installing the application 124 on the user device 104 using application stores associated with Apple iOS®, Android™ OS, Google Chrome® OS, Windows® OS, BlackBerry® OS, Embedded Linux, web OS, Palm OS® and the like. Alternatively, the e-commerce fulfillment application 124 may be accessed through the web using Internet.

Figure 6:
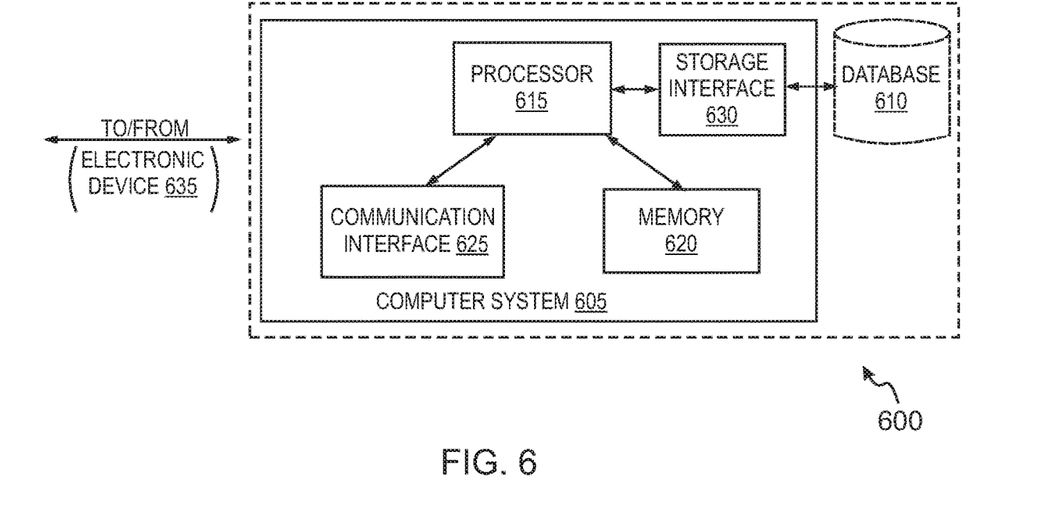
FIG. 6 is a block diagram of the server of FIG. 1, in accordance with an example embodiment.

It is noted that the instructions (or the executable code) configuring the e-commerce fulfillment application 124 are stored in a memory of the server 122, and the instructions are executed by a processor (for example, a single-core or a multi-core processor) included within the server 122, as is exemplarily shown with reference to FIG. 6. However, once the e-commerce fulfillment application 124 is installed on the user device 104, the user device 104, via its processor, can control the entire process of e-commerce fulfillment using the e-commerce fulfillment application 124 present therein.

Various components for carrying out the e-commerce fulfillment in conjunction with the e-commerce fulfillment application 124 are further explained with reference to FIG. 2.

Figure 2:
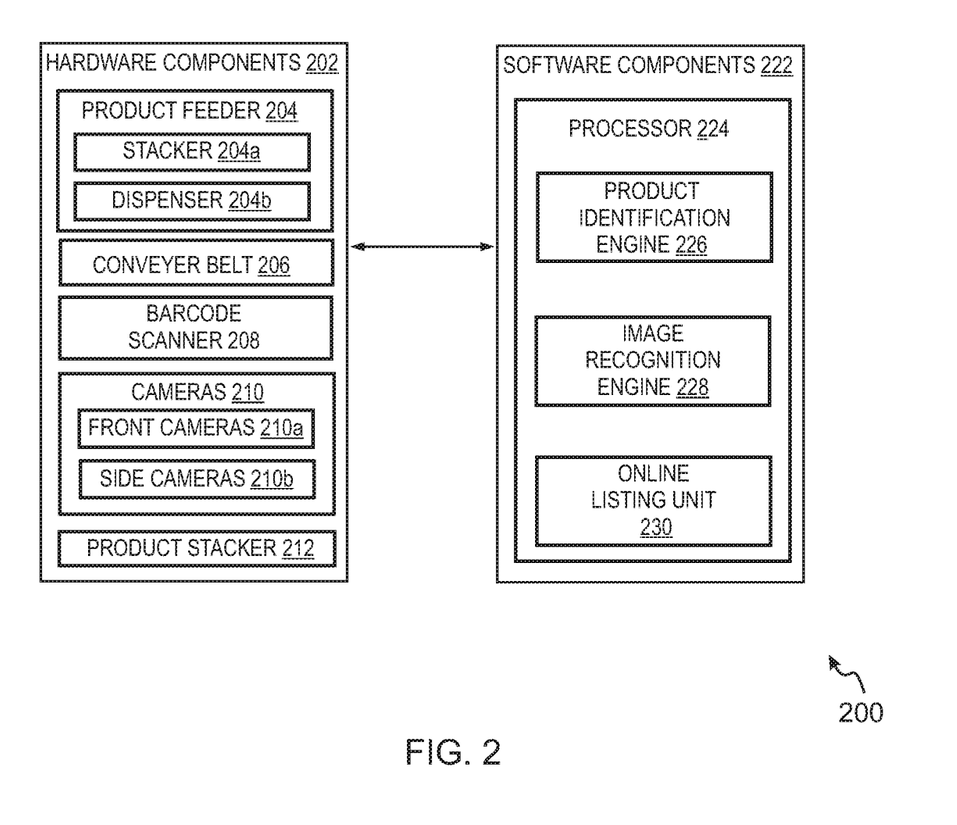
FIG. 2 is a functional block diagram depicting various hardware components and software components of a system for ecommerce fulfillment, in accordance with an example embodiment.

FIG. 2 is a functional block diagram of a system 200 for ecommerce fulfillment, in accordance with an embodiment. The system 200 includes various hardware components 202 and software components 222. A portion of the system 200 may be embodied in a server, such as the server 122 or an electronic device, such as, the user device 104 accessible by the user 102. The system 200 enables the user 102 to automatically process, list, and package a batch of products for ecommerce sale. In an example, the products are used books. The functionalities of the hardware components 202 and the software components 222 present in the system 200 in at least some example embodiments are explained in the following description.

In an embodiment, the hardware components 202 of the system 200 include a product feeder 204 and a conveyor belt 206. The product feeder 204 further includes a stacker 204a and a dispenser 204b. The stacker 204a is configured to receive a plurality of products in a batch. The stacker 204a is also configured to place each product of the plurality of products inside the dispenser 204b. The dispenser 204b is configured to place each product consistently on the conveyor belt 206. In an embodiment, the conveyor belt 206 moves by suitable mechanical means known in the art to carry the plurality of products from one place to another. In an example, the conveyor belt 206 has a Y-shape configuration and includes a first conveyor path and a second conveyor path, such as the paths 112a and 112b shown in FIG. 1.

The hardware components 202 of the system 200 further includes a barcode scanner 208 that is placed on the conveyor belt 206. The barcode scanner 208 is configured to continuously scan barcode provided on each product as they move along the conveyor belt 206 to determine product barcode information associated with each product. In an embodiment, the barcode scanner 208 is preconfigured in an automatic mode for continuous scanning of the plurality of products placed on the conveyor belt 206.

Furthermore, the hardware components 202 of the system 200 include a plurality of cameras 210 and a product stacker 212. The plurality of cameras 210 include a plurality of front cameras 210a and a plurality of side cameras 210b which are placed on the first conveyor path (112a) of the conveyor belt 206 to capture a plurality of pictures of each product. The plurality of front cameras 210a is configured to capture each and every detail of each product from front side of each product. The plurality of side cameras 210b is configured to capture each and every detail of each product from all other sides except the front side of each product. In an embodiment, the product stacker 212 is configured to receive the plurality of products moving on the first conveyor path of the conveyor belt 206 and to store the plurality of products in a compartment. The product stacker 212 is further configured to generate a shipment label if the weight of the plurality of products in the compartment reaches a predefined limit. Further, the product stacker 212 prepares a shipment to be dispatched to the fulfillment center by placing the plurality of products of the compartment in a shipment box and attaching the shipment label on the shipment box. In at least one example embodiment, a tape is also applied on the shipment box including the plurality of products for sealing the shipment box.

The software components 222 of the system 200 may be communicably coupled with the hardware components 202 of the system 200 through suitable networks such as including but not limited to the internet, and both software components 222 and hardware components 202 of the system 200 may exchange various control commands and share product barcode information and sales data. The software components 222 include a processing module 224 which is configured to send instructions to hardware components 202 for operation of the hardware components 202 of the system 200. The processing module 224 includes a product identification engine 226, an image recognition engine 228 and an online listing unit 230.

In at least one example embodiment, the product identification engine 226 is configured to collect sales data associated with each product of the plurality of products. For collecting the sales data, the product identification engine 226 is configured to call a sales data application program interface (API) for each product based on the product barcode information associated with each product. In an embodiment, the sales data associated with each product includes a current market price of each product, a competitor price of each product, and a product sales rank of each product. The product identification engine 226 is also configured to calculate a product value of each product based on the sales data associated with each product. The product value of each product may be used by the product identification engine 226 to compute ROI associated with each product.

The processing module 224 is also configured classify the plurality of products into valuable products and non-valuable products by comparing the calculated ROI with a threshold ROI set for each product. In an embodiment, the image recognition engine 228 is configured to determine condition of each valuable product by comparing the plurality of pictures captured by the plurality of cameras for each valuable product with a plurality of sample pictures stored in a database (shown in FIG. 6) for respective product.

In an embodiment, the online listing unit 230 is configured to list valuable products on an e-commerce platform/online selling platform. A product information associated with each valuable product is also listed on the online selling platform. In an embodiment, the number of valuable products listed on the online selling platform depends on a maximum weight capacity/predefined limit set by the user for inbound shipments. The online listing unit 230 is also configured to generate a shipment label upon reaching predefined limit set by the user for inbound shipments.

Figure 3:
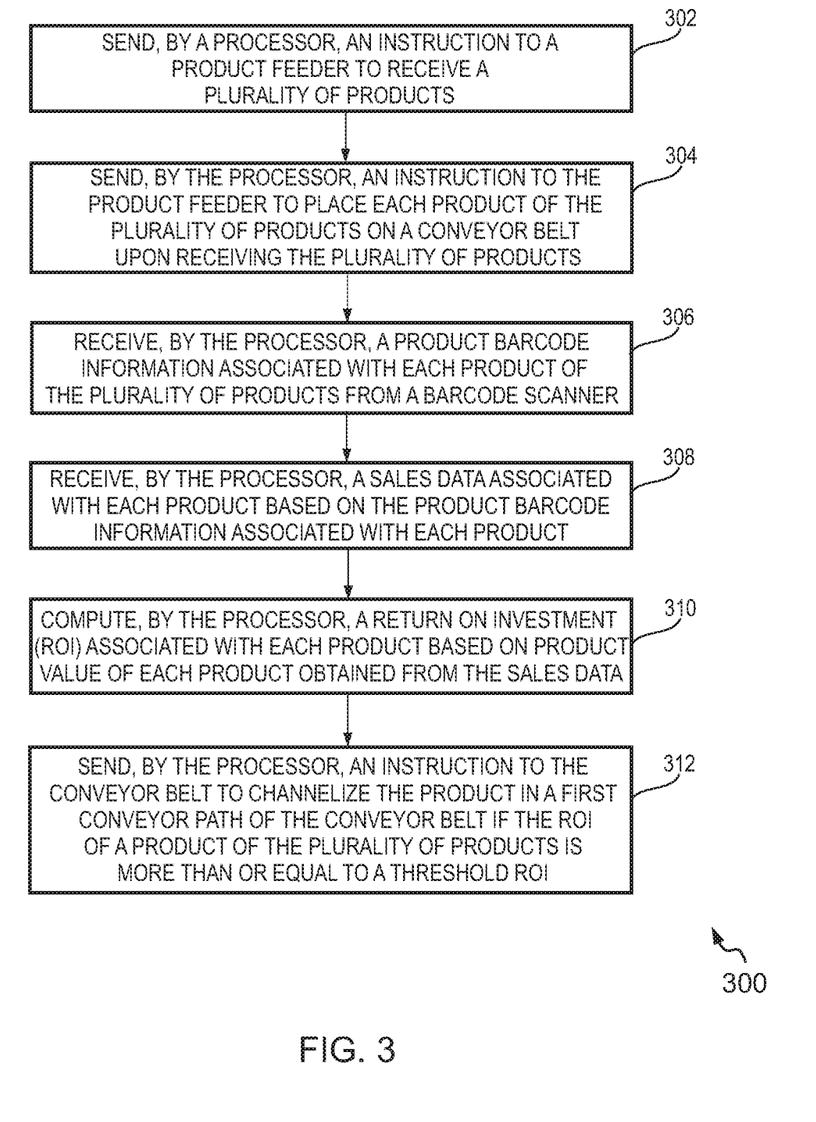
FIG. 3 is a flowchart illustrating a method for e-commerce fulfillment, in accordance with an example embodiment.

FIG. 3 is a flowchart illustrating a method 300 for e-commerce fulfillment, in accordance with an example embodiment. The operations of the method 300 may be carried out by a server such as the server 122, the system 200 or the user device 104. The sequence of operations of the method 300 may not be necessarily executed in the same order as they are presented. Further, one or more operations may be grouped together and performed in form of a single step, or one operation may have several sub-steps that may be performed in parallel or in sequential manner.

At operation 302, the method 300 includes sending, by a processor, an instruction to a product feeder to receive a plurality of products. The product feeder is being instructed to receive the plurality of products from a user facility. The user facility may comprise the plurality of products (used products) that the user wants to sell on an e-commerce platform/online selling platform.

At operation 304, the method 300 includes sending, by the processor, an instruction to the product feeder to place each product of the plurality of products on a conveyor belt upon receiving the plurality of products. The product feeder is instructed to continuously place each product of the plurality of products on the conveyor belt.

At operation 306, the method 300 includes receiving, by the processor, a product barcode information associated with each product of the plurality of products from a barcode scanner. The barcode scanner may scan a product barcode placed on each product of the plurality of products to identify the product. The barcode scanner is preconfigured in an automatic mode for continuous scanning of the plurality of products placed on the conveyor belt.

At operation 308, the method 300 includes receiving, by the processor, a sales data associated with each product based on the product barcode information associated with each product. A sales data API is called by the processor using the product barcode information. The sales data API will return the sales data associated with each product.

At operation 310, the method 300 includes computing, by the processor, a return on investment (ROI) associated with each product based on a product value of each product obtained from the sales data. The product value is determined for each product of the plurality of products based on the sales data. Further, the product value is used by the processor to calculate the ROI associated with each product.

At operation 312, the method 300 includes sending, by the processor, an instruction to the conveyor belt to channelize the product in a first conveyor path of the conveyor belt if the ROI of a product of the plurality of products is more than or equal to a threshold ROI. In an embodiment, the calculated ROI associated with a product may be compared with the threshold ROI set by the user for that product. If the calculated ROI found to be more than or equal to threshold ROI, the product is considered as valuable else not valuable. The valuable products are diverted/channelized to the first conveyor path of the conveyor belt.

Figure 4:
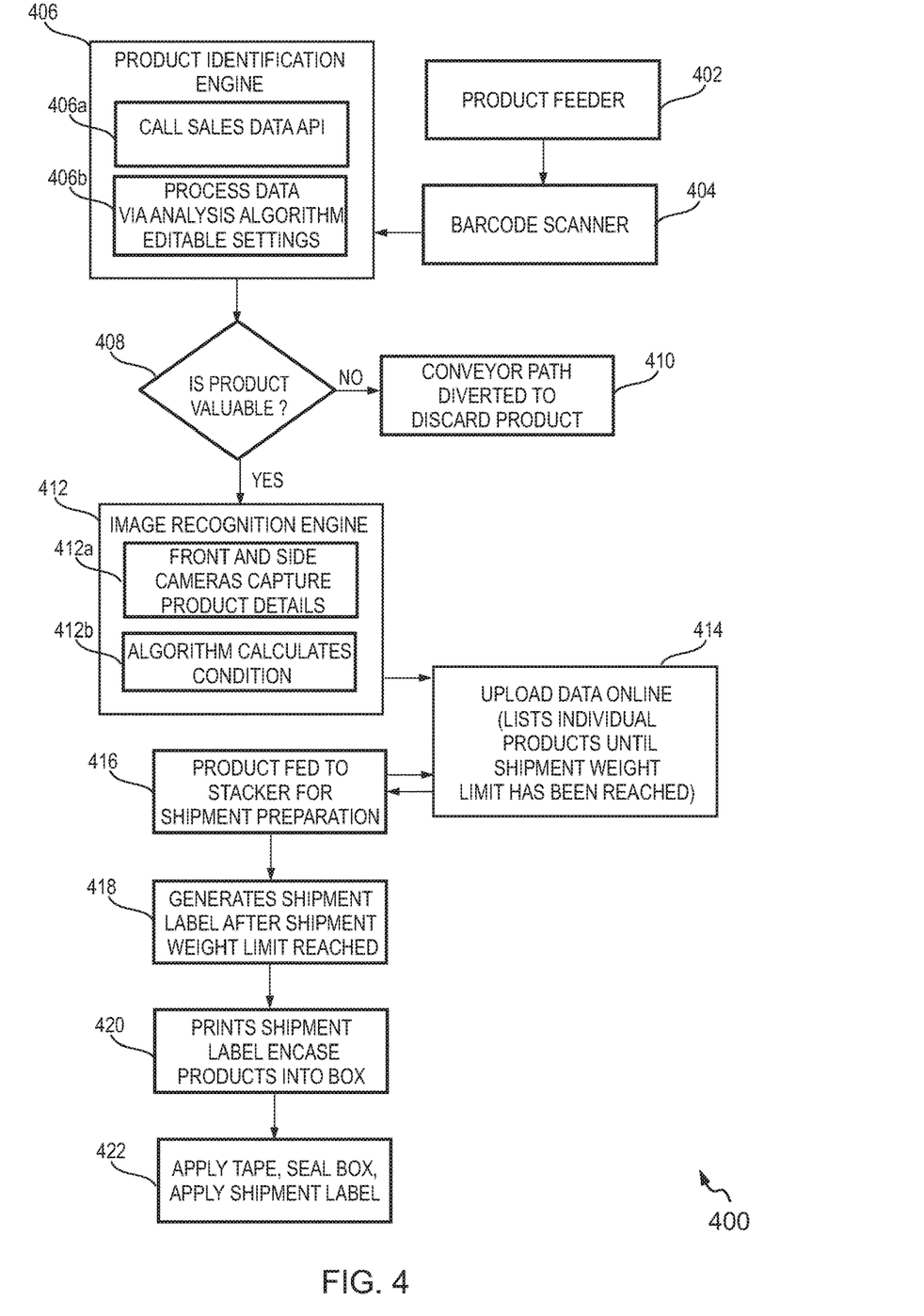
FIG. 4 is a sequence flow diagram for e-commerce fulfillment, in accordance with an example embodiment.

FIG. 4 is a sequence flow diagram 400 for e-commerce fulfillment, in accordance with an example embodiment. The sequence of operations of the flow diagram 400 need not be necessarily executed in the same order as they are presented. Further, one or more operations may be grouped and performed in form of a single step, or one operation may have several sub-steps that may be performed in parallel or in sequential manner.

At operation 402, the product feeder 204 places each product of a plurality of products consistently on the conveyor belt 206. At operation 404, the barcode scanner 208 scans each product of the plurality of products as they move along the conveyor belt 206 to determine product barcode information associated with each product. The product barcode information determined by the barcode scanner 208 is shared with the product identification engine 226.

An operation 406 is combination of operation 406a and 406b. At operation 406a, the product identification engine 226 calls sales data API to collect sales data associated with each product of the plurality of products based on the product barcode information collected by the barcode scanner 208 for each product. At operation 406b, the sales data collected for each product is used to determine product value of each product and an ROI value is generated for each product based on the product value of each product.

At operation 408, the generated ROI value is compared with a threshold ROI set by the user for respective product to determine whether the product is valuable or not. At operation 410, if the product found to be invaluable, the product will be channelized to the second conveyor path of the conveyor belt 206 where the product will be discarded. Otherwise, the product is channelized to the first conveyor path of the conveyor belt 206.

An operation 412 is combination of operation 412a and 412b. At operation 412a, the plurality of front cameras 210a and side cameras 210b capture a plurality of pictures of each product placed on the first conveyor path from different positions to get a complete perspective of each product for accurate grading. The captured pictures are shared with the image recognition engine 228. At operation 412b, the image recognition engine 228 determines condition of each product by comparing the plurality of pictures captured by the plurality of front cameras 210a and side cameras 210b with a plurality of sample pictures to determine the condition of each product. A sample data set comprising the plurality of sample pictures is already available in a database (shown in FIG. 6) associated with the server 122. In an embodiment, the image recognition engine 228 may use machine learning for image comparison. In at least one example embodiment, four grades are used for defining product condition. The four grades are 'Acceptable', 'Good', 'Very Good', and 'Like New'.

At operation 414, the online listing unit 230 lists valuable products on the e-commerce platform/online selling platform depending on a maximum weight capacity/predefined limit set by the user for inbound shipments. The listing includes product information of each product which further comprises a name of each product and the condition of each product.

At operation 416, the product stacker 212 collects the valuable products from the conveyor belt 206 for preparing shipment for the valuable products. At operation 418, a shipment label is generated by the online listing unit 230 after the predefined limit is reached for products.

At operation 420, the product stacker 212 prints the shipment label and places the products in a shipment box. At operation 422, the product stacker 212 applies tape on the shipment box for sealing the shipment box. The printed shipment label is also pasted on the shipment box before dispatching the shipment box to the fulfillment center.

Figure 5:
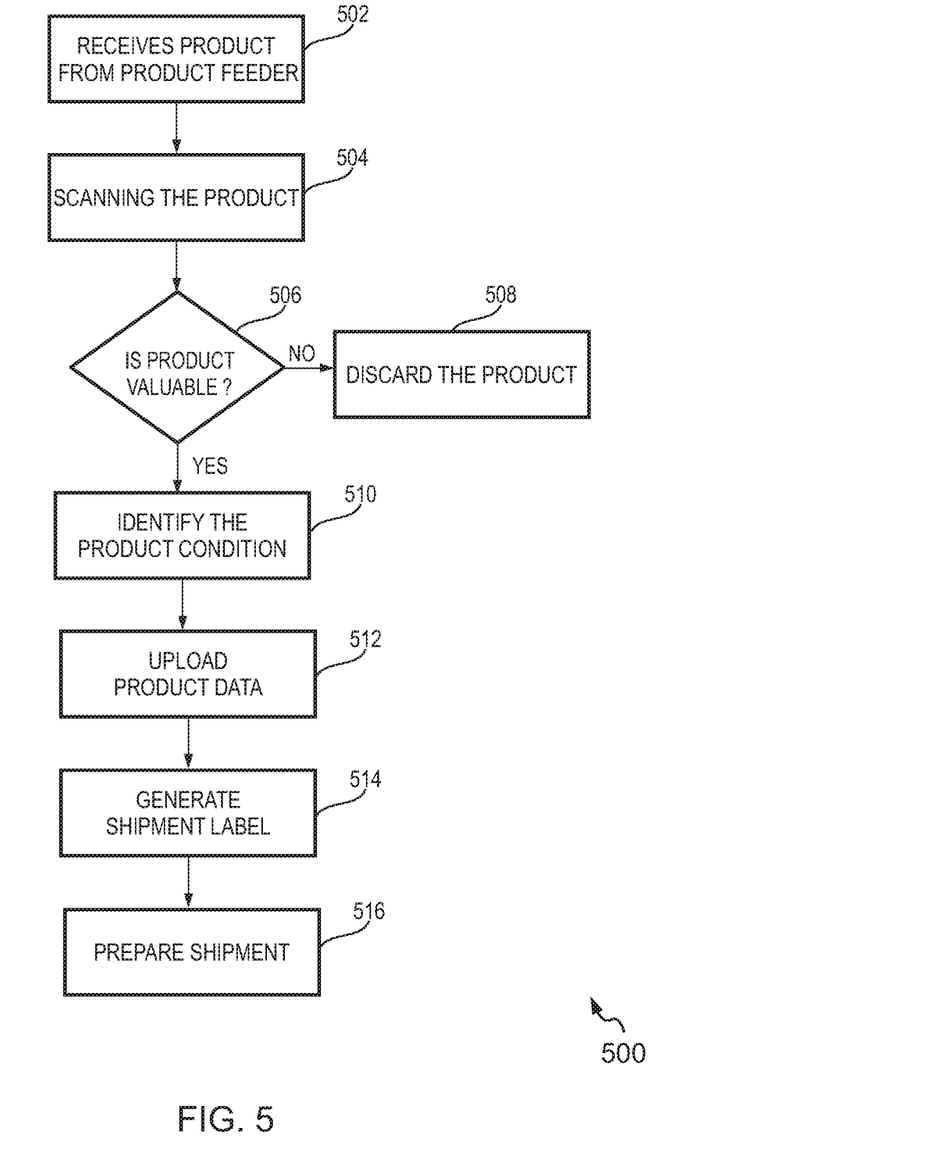
FIG. 5 is a flowchart illustrating a method for automatically packaging a product for ecommerce sale, in accordance with an example embodiment.

FIG. 5 is a flowchart illustrating a method 500 for automatically packaging a product for ecommerce sale, in accordance with an example embodiment. The operations of the method 500 may be partially carried out by the server 122 and partially by the e-commerce fulfillment machine 108. The sequence of operations of the method 500 may not be necessarily executed in the same order as they are presented. Further, one or more operations may be grouped together and performed in form of a single step, or one operation may have several sub-steps that may be performed in parallel or in sequential manner.

At operation 502, a product is received on a conveyor belt from a product feeder. The product feeder may be placed at user's facility for continuously feeding products on the conveyor belt. At operation 504, the product is scanned at the conveyor belt. The scanning may be performed by a scanner placed on the conveyor belt. The scanner may scan a product barcode for identifying the product.

At operation 506, the product is valuable or not is determined. A product value is determined for the product by a product identification engine (e.g., the product identification engine 226) and the product value is used to calculate return on investment (ROI) associated with the product. The calculated ROI may further be compared with a threshold ROI of the product. If the ROI of the product found to be more than or equal to the threshold ROI, the product is considered as valuable else non-valuable. At operation 508, the product is discarded on determining that the product is non-valuable.

At operation 510, the product condition is identified on determining that the product is valuable. The product condition may be identified using a plurality of cameras installed on the first conveyor path of the conveyor belt.

At operation 512, a product data/product information is uploaded on an online selling platform. The product data comprises a name of the product and the condition of the product. At operation 514, a shipment label is generated for the product. The shipment label may contain the information, such as weight of the product, e-commerce fulfillment center information etc.

At operation 516, a shipment is prepared by packing the product in a shipment box. The generated shipment label may also be pasted on the shipment box before dispatching the shipment box to the fulfillment center.

The disclosed systems and methods with reference to FIGS. 1 to 5, or one or more operations of the flow diagrams 300 and 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIG. 6 is a simplified block diagram of a server system 600, in which the e-commerce fulfillment application 124 may be stored, in accordance with one embodiment of the present disclosure. The server system 600 is an example of the server 122 shown and explained with reference to FIG. 1. The server system 600 includes a computer system 605 and one or more databases, such as a database 610.

The computer system 605 includes a processor 615 for executing instructions. Instructions may be stored in, for example, but not limited to, a memory 620. The processor 615 may include one or more processing units (e.g., in a multi-core configuration). The processor 615 is operatively coupled to a communication interface 625 such that the computer system 605 is capable of communicating with a remote device such as an electronic device 635. Example of the electronic device 635 may include, but are not limited to the user device 104 shown in FIG. 1.

The processor 615 may also be operatively coupled to the database 610. The database 610 is configured to store the e-commerce fulfillment application 124 capable of providing e-commerce fulfillment as explained with reference to FIGS. 1 to 5. The database 610 is any computer-operated hardware suitable for storing and/or retrieving data. The database 610 may include multiple storage units such as hard disks and/or solid-state disks in a redundant array of inexpensive disks (RAID) configuration. The database 610 may include, but not limited to, a storage area network (SAN) and/or a network attached storage (NAS) system.

In some embodiments, the database 610 is integrated within the computer system 605. For example, the computer system 605 may include one or more hard disk drives as the database 610. In other embodiments, the database 610 is external to the computer system 605 and may be accessed by the computer system 605 using a storage interface 630. The storage interface 630 is any component capable of providing the processor 615 with access to the database 610. The storage interface 630 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 615 with access to the database 610.

The memory 620 is a storage device embodied as one or more volatile memory devices, one or more non-volatile memory devices, and/or a combination of one or more volatile memory devices and non-volatile memory devices, for storing micro-contents information and instructions. The memory 620 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for e-commerce fulfillment and thereby provides a fully automated system which determines the product value automatically and hence the user doesn't have to spend time on classifying products. The time user spent on packaging is also saved as the user no longer need to apply product labels or prepare shipments for the products. Thereby, using technology of the present disclosure, a large volume of unsorted products can easily be processed without human supervision or interference which further ensures increased productivity, consistent production, accurate processing, time saving, labor reduction, and workspace optimization.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and\or implementation without departing from the spirit or scope of the claims.

What is claimed is:

1. A method, comprising: sending, by a processor, an instruction to a product feeder to receive a plurality of products; upon receiving the plurality of products, sending, by the processor, an instruction to the product feeder to place each product of the plurality of products on a conveyor belt; receiving, by the processor, a product barcode information associated with each product of the plurality of products from a barcode scanner, the barcode scanner being preconfigured in an automatic mode for scanning of the plurality of products placed on the conveyor belt; receiving, by the processor, a sales data associated with each product based on the product barcode information associated with each product; receiving, by the processor, at least one user input from a user device to set a threshold return on investment (ROI) for each product of the plurality of products and a predefined limit for inbound shipments; generating, by the processor, a shipment label after the predefined limit is reached for a plurality of products, wherein the shipping label contains information at least but not limited to: weight of the product, and e-commerce fulfillment center information; computing, by the processor, a return on investment (ROI) associated with each product based on a product value of each product obtained from the sales data; and if the ROI of a product of the plurality of products is more than or equal to a threshold ROI, sending, by the processor, an instruction to the conveyor belt to channelize the product to a first conveyor path of the conveyor belt, wherein the first conveyor path is for products approved for shipment.

2. The method as claimed in claim 1, further comprising: sending, by the processor, an instruction to the conveyor belt to channelize the product to a second conveyor path if the ROI of the product is less than the threshold ROI, wherein the second conveyor path is for discarded products of the plurality of products.

3. The method as claimed in claim 1, further comprising: determining, by the processor, a condition of each product using a plurality of cameras installed on a first conveyor path of the conveyor belt; and facilitating, by the processor, uploading a product information of each product of the plurality of products on an online selling platform.

4. The method as claimed in claim 3, wherein determining the condition of each product comprises:

sending, by the processor, an instruction to the plurality of cameras to capture a plurality of pictures of each product;
receiving, by the processor, the plurality of pictures of each product captured by the plurality of cameras; and
processing, by the processor, the plurality of pictures of each product by comparing the plurality of pictures with a plurality of sample pictures to determine the condition of each product.

5. The method as claimed in claim 3, wherein the product information of each product comprises a name of each product and the condition of each product.

6. The method as claimed in claim 1, further comprising:
sending, by the processor, an instruction to a product stacker to receive each product of the plurality of products from the first conveyor path and store the plurality of products in a compartment;
sending, by the processor, an instruction to the product stacker to generate a shipment label if weight of the plurality of products in the compartment reaches a predefined limit; and
sending, by the processor, an instruction to the product stacker to prepare a shipment to be dispatched to a fulfillment center by placing the plurality of products of the compartment in a shipment box and placing the shipment label on the shipment box.

7. The method as claimed in claim 1, wherein each product of the plurality of products is at least one of:
a used book;
a used compact disk (CD); and
a used digital versatile disk (DVD).

8. The method as claimed in claim 1, further comprising:
receiving, by the processor, the threshold ROI for each product of the plurality of products from a user.

9. The method as claimed in claim 1, wherein the sales data associated with each product comprises a current market price of each product, a competitor price of each product, and a product sales rank of each product.

10. The method as claimed in claim 1, wherein receiving the sales data associated with each product comprises:
sending, by the processor, a request to a sales data application program interface (API) to collect sales data of each product based on the product barcode information of each product.

11. A server system, comprising: a memory configured to store instructions; and a processor configured to execute the instructions stored in the memory and thereby cause the server system to perform: sending an instruction to a product feeder to receive a plurality of products; upon receiving the plurality of products, sending an instruction to the product feeder to place each product of the plurality of products on a conveyor belt; receiving a product barcode information associated with each product of the plurality of products from a barcode scanner, the barcode scanner being preconfigured in an automatic mode for continuous scanning of the plurality of products placed on the conveyor belt; receiving a sales data associated with each product based on the product barcode information associated with each product; receiving, at least one user input from a user device to set a threshold Return on Investment (ROI) for each product of the plurality of products and a predefined limit for inbound shipments; generating, a shipment label after the predefined limit is reached for a plurality of products, wherein the shipping label contains information at least but not limited to: weight of the product, and e-commerce fulfillment center information; computing a return on investment (ROI) associated with each product based on a product value of each product obtained from the sales data; and if the ROI of a product of the plurality of products is more than or equal to a threshold ROI, sending an instruction to the conveyor belt to channelize the product to a first conveyor path of the conveyor belt, wherein the first conveyor path is for products approved for shipment.

12. The server system as claimed in claim 11, wherein the processor is further configured to:
send an instruction to the conveyor belt to channelize the product to a second conveyor path if the ROI of the product is less than the threshold ROI, wherein the second conveyor path is for discarded products of the plurality of products.

13. The server system as claimed in claim 11, wherein the processor is further configured to:
determine a condition of each product using a plurality of cameras installed on the first conveyor path of the conveyor belt; and
facilitate uploading a product information of each product of the plurality of products on an online selling platform.

14. The server system as claimed in claim 13, wherein to determine the condition of each product, the processor is further configured to:
send an instruction to the plurality of cameras to capture a plurality of pictures of each product;
receive the plurality of pictures of each product captured by the plurality of cameras; and
process the plurality of pictures of each product by comparing the plurality of pictures with a plurality of sample pictures to determine the condition of each product.

15. The server system as claimed in claim 13, wherein the product information of each product comprises a name of each product and the condition of each product.

16. The server system as claimed in claim 11, wherein the processor is further configured to:
send an instruction to a product stacker to receive each product of the plurality of products from the first conveyor path and store the plurality of products in a compartment;
send an instruction to the product stacker to generate a shipment label if weight of the plurality of products in the compartment reaches a predefined limit; and
send an instruction to the product stacker to prepare a shipment to be dispatched to a fulfillment center by placing the plurality of products of the compartment in a shipment box and placing the shipment label on the shipment box.

17. The server system as claimed in claim 11, wherein the sales data associated with each product comprises a current market price of each product, a competitor price of each product, and a product sales rank of each product.

18. The server system as claimed in claim 11, wherein the processor is further configured to:
receive the threshold ROI for each product of the plurality of products from a user.

19. A system, comprising: a product feeder adapted to place a plurality of products on a conveyor belt, the conveyor belt being configured to carry the plurality of products from one place to another; a barcode scanner adapted to be placed on the conveyor belt, the barcode scanner being configured to scan a barcode provided on each product of the plurality of products to determine a product barcode information associated with each product of the plurality of products on the conveyor belt; a plurality of cameras configured to capture a plurality of pictures of each product of the plurality of products on the conveyor belt; a processing module for providing operating instructions to the product feeder, the conveyor belt, the barcode scanner and the plurality of cameras, and for processing information collected by the barcode scanner and the plurality of cameras, the processing module comprising a product identification engine configured to: collect sales data associated with each product of the plurality of products based on the product barcode information; calculate a product value of each product based on the sales data associated with each product; and receive, at least one user input from a user device to set a threshold Return On Investment (ROI) for each product of the plurality of products and a predefined limit for inbound shipments; compute a Return on Investment (ROI) for each product based on the product value of each product; and wherein the processing module to further configured to: classify the plurality of products into valuable products and non-valuable products by comparing the calculated ROI with a threshold ROI for each product of the plurality of products based on the product value of each product; and if the ROI of a product of the plurality of products is more than or equal to a threshold ROI, send an instruction to the conveyor belt to channelize the product to a first conveyor path of the conveyor belt, wherein the first conveyor path is for products approved for shipment; and a product stacker configured to receive the plurality of products from the first conveyor path and store the plurality of products in a compartment for labelling and generate, a shipment label after the predefined limit is reached for plurality of products, wherein the shipping label contains information at least but not limited to: weight of the product and e-commerce fulfillment center information.

20. The system as claimed in claim 19, wherein the processing module comprises:
an image recognition engine for determining condition of each product of the plurality of products based on the plurality of pictures captured by the plurality of cameras for each product; and
an online listing unit configured to perform an online listing of the valuable products on an online selling platform.

* * * * *